United States Patent [19]

Jones et al.

[11] Patent Number: 5,002,748
[45] Date of Patent: * Mar. 26, 1991

[54] METHOD FOR THE PREPARATION OF COPPER ARSENATE

[75] Inventors: David L. Jones, Rossland; Edward F. G. Milner, Trail, both of Canada

[73] Assignee: Cominco Ltd., Vancouver, Canada

[*] Notice: The portion of the term of this patent subsequent to Sep. 25, 2007 has been disclaimed.

[21] Appl. No.: 239,897

[22] Filed: Sep. 2, 1988

[51] Int. Cl.$^5$ .................. C01G 28/02; C01G 3/02; A01N 59/22

[52] U.S. Cl. .................. 423/42; 423/43; 423/87; 423/602; 424/622

[58] Field of Search .......... 423/42, 43, 47, 87, 423/601, 602, 604, 617, 34, 36; 424/622, 626, 630, 620; 252/385; 106/15.05

[56] References Cited

U.S. PATENT DOCUMENTS

| | | | |
|---|---|---|---|
| 4,049,514 | 9/1977 | Freeman et al. | 75/108 |
| 4,244,734 | 1/1981 | Reynolds et al. | 75/115 |
| 4,357,261 | 11/1982 | Takahashi et al. | 252/385 |
| 4,405,569 | 9/1983 | Dienstbach | 423/27 |

FOREIGN PATENT DOCUMENTS 1029298 4/1978 Canada .
1094973 2/1981 Canada .

Primary Examiner—Michael L. Lewis
Assistant Examiner—Steven Bos
Attorney, Agent, or Firm—Arne I. Fors

[57] ABSTRACT

Copper arsenate, substantially free from impurities that form sludge in wood preservatives such as chromated copper arsenate, is prepared by adding a solution of soluble arsenate to copper sulfate solution, either or both solutions containing sludge-forming impurities, to form a copper and arsenic-containing solution without precipitating copper arsenate. The pH during the adding is controlled at a value in the range of 1.8 to 2.2 to precipitate impurities. Precipitated impurities are removed, and the copper and arsenic-containing solution is neutralized with a suitable alkaline substance to pH 3.5 to 5.0 to precipitate copper arsenate. Arsenate solution is derived from arsenic oxides, soluble arsenic salts and compounds and metallurgical materials capable of yielding water-soluble arsenate. Copper sulfate solution is derived from crystals and compounds and metallurgical materials cable of yielding copper sulfate. In a preferred embodiment, sodium arsenate is derived by aqueous caustic oxidative pressure leaching of flue dusts and copper sulfate is derived by aqueous acid oxidative pressure leaching of copper matte.

23 Claims, 2 Drawing Sheets

METHOD FOR THE PREPARATION OF COPPER ARSENATE

This invention relates to a method for the preparation of copper arsenate and, more particularly, to a method for the preparation of pure copper arsenate from a soluble arsenate and from copper sulfate, either or both containing impurities.

BACKGROUND OF THE INVENTION

Copper arsenate is a compound that has insecticidal and fungicidal properties, and finds application in wood preservatives such as chromated copper arsenate. But, when prepared from materials of metallurgical origin, the copper arsenate product has generally not found application in the wood preserving industry because of its content of impurities. The impurities, which derive from metallurgical source materials, tend to form precipitates and sludges during the preparation, storage and application of copper arsenate-based wood preservatives.

Chromated copper arsenate is generally made by dissolving the oxides of the constituent elements, but it could be made, for example, by dissolving copper arsenate in chromic acid. Copper arsenate can be made simply by reacting solutions of a soluble arsenate and copper sulfate that are obtained from metallurgical processes. The arsenate solution may be obtained from the leaching of arsenic-containing materials such as arsenical ores, concentrates, speiss, fumes, flue dusts and the like in an acidic or alkaline medium under pressure and at elevated temperatures, usually in the presence of oxygen, or from other sources such as obtained from solvent extraction of copper refinery electrolyte. Copper sulfate solution may be prepared by dissolving copper sulfate crystals or by leaching copper-containing materials such as concentrates, dusts, slimes, copper scrap, mattes and slags in sulfuric acid.

For example, according to CA Patent 1 094 973, cement copper cake obtained in the zinc dust purification of zinc sulfate electrolyte is leached with acid, the leach residue is leached with caustic at 95° C. while adding air to extract arsenic in solution, and the solution is reacted with copper sulfate to form copper arsenate. CA Patent 1 029 298 discloses a method for making copper arsenate by reacting copper with arsenic acid in the presence of an oxidizing agent and a catalyst. It is mentioned that Ni, Zn, Al and other trace elements are not harmful, but that iron in excess of 1% should be avoided. According to Ger. Offen. DE 3 048 404, smelter flue dust containing Cu, As, Sb, Bi and S is slurried with water and copper sulfate crystals, and the mixture is autoclaved for 3 hours at 120° C. under an oxygen partial pressure of 2 $kg/cm^2$. Copper arsenate is subsequently precipitated in an alkaline medium. It is disclosed in U.S. Pat. No. 4 405 569 that complex arsenic ores, residues or speisses can be subjected to a two-stage oxidative caustic leach at 150° C., giving solution from which sodium arsenate may be crystallized and converted to copper arsenate, or from which copper arsenate may be directly precipitated.

As pointed out, however, the arsenate and copper sulfate solutions prepared from metallurgical sources, products and intermediates contain sludge-forming impurities, such as lead and iron. Tentative new specifications for copper arsenate require the total lead and the iron contents to be not more than 0.1% by weight. Thus, to produce a relatively pure copper arsenate that is substantially free of sludge-forming impurities, a method must be devised to eliminate these impurities.

SUMMARY OF THE INVENTION

We have now found that copper arsenate meeting the proposed specification for impurities may be prepared from metallurgical starting materials. More specifically, we have found that by reacting a copper sulfate solution with an arsenate solution under controlled conditions, either or both solutions containing undesirable impurities, the undesirable impurities, especially lead and iron, can be effectively removed yielding copper arsenate suitable for application in wood preservatives such as chromated copper arsenate.

Accordingly, it is an object of the present invention to prepare copper arsenate with a low impurity content.

It is another object of the present invention to prepare substantially pure copper arsenate by controlled reaction of copper sulfate with soluble arsenate derived from metallurgical raw materials.

It is a further object to prepare copper arsenate substantially free from sludge-forming impurities by the controlled addition of sodium arsenate to copper sulfate derived from flue dust and copper matte, respectively.

These and other objects are attained in the broadest aspect of the method of the invention by providing a method for the preparation of copper arsenate comprising the steps of adding a solution of water soluble arsenate to a copper sulfate solution, at least one of the arsenate solution and said copper sulfate solution containing sludge-forming impurities, to form a copper and arsenic-containing solution without precipitating copper arsenate, the amount of copper and the amount of arsenic in said copper and arsenic-containing solution being such that copper arsenate can be formed; causing said impurities to precipitate by controlling the pH in the range in which said sludge-forming impurities precipitate, and in which copper arsenate does not precipitate; separating precipitated impurities from said copper and arsenic-containing solution; neutralizing said copper and arsenic-containing solution to precipitate copper arsenate; and recovering copper arsenate substantially free from said sludge-forming impurities.

Preferably, said solution of water soluble arsenate is derived from arsenic and antimony-containing flue dust, said flue dust is subjected to an aqueous caustic soda oxidative pressure leach to selectively leach arsenic from said flue dust to form a leach residue and to form a leach solution containing sodium arsenate and sludge-forming impurities, and separating said leach residue from said leach solution.

Preferably, said copper sulfate solution is derived from copper matte, said copper matte is subjected to an aqueous acid oxidative pressure leach to leach copper selectively from said matte to form a leach residue and to form a leach solution containing copper sulfate and sludge-forming impurities, and separating said leach residue from said leach solution.

According to a preferred embodiment, the preparation of copper arsenate substantially free of sludge-forming impurities that may form precipitates in liquid wood preservatives comprises the steps of: subjecting arsenic and antimony-containing flue dust to an aqueous caustic soda oxidative pressure leach in a slurry containing sodium hydroxide in an amount in the range of about 10 to 50 g sodium hydroxide per liter of slurry in excess of the stoichiometric amount of sodium hydroxide with respect to the amount of arsenic and antimony in said flue dust, and carrying out said leach at a temperature controlled in the range of about 120 to 180° C. under a pressure with added oxygen in the range of about 0.7 to 2.0 MPa and with agitation for the formation of a first leach solution containing arsenic in an amount in the range of about 50 to 100 g/l as sodium arsenate and sludge-forming impurities and a first leach residue containing sodium antimonate; separating said first leach solution from said first leach residue; subjecting copper matte to a size reduction to reduce particle sizes to 100 micron or less, subjecting size-reduced matte to an aqueous acid oxidative pressure leach in a reaction mixture with sulfuric acid at a temperature in the range of about 100 to 150° C. under a partial pressure of oxygen in the range of about 0.7 to 2.0 MPa for the formation of a second leach solution containing copper sulfate and sludge-forming impurities and a second leach residue; separating said second leach solution from said second leach residue; adding first leach solution to second leach solution at a temperature in the range of about 60 to 100° C. to form a copper and arsenic-containing solution without precipitating copper arsenate while controlling the amount of copper and the amount of arsenic in said copper and arsenic-containing solution such that copper arsenate can be formed, and causing said impurities to precipitate by controlling the pH during said adding of said first leach solution to said second leach solution at a value in the range of about 1.8 to 2.2; separating precipitated impurities from said copper and arsenic-containing solution; neutralizing said copper and arsenic-containing solution after said separating of impurities to precipitate copper arsenate by the addition of sodium hydroxide to a value of the pH in said solution in the range of about 3.5 to 5.0, and maintaining a temperature during said neutralizing in the range of about 60 to 90° C.; and recovering precipitated copper arsenate.

BRIEF DESCRIPTION OF DRAWINGS

The embodiments of the invention will now be described in detail with reference to the accompanying drawings, wherein.

In the flowsheets, like operations are indicated with like numerals.

DETAILED DESCRIPTION

Figure 1:
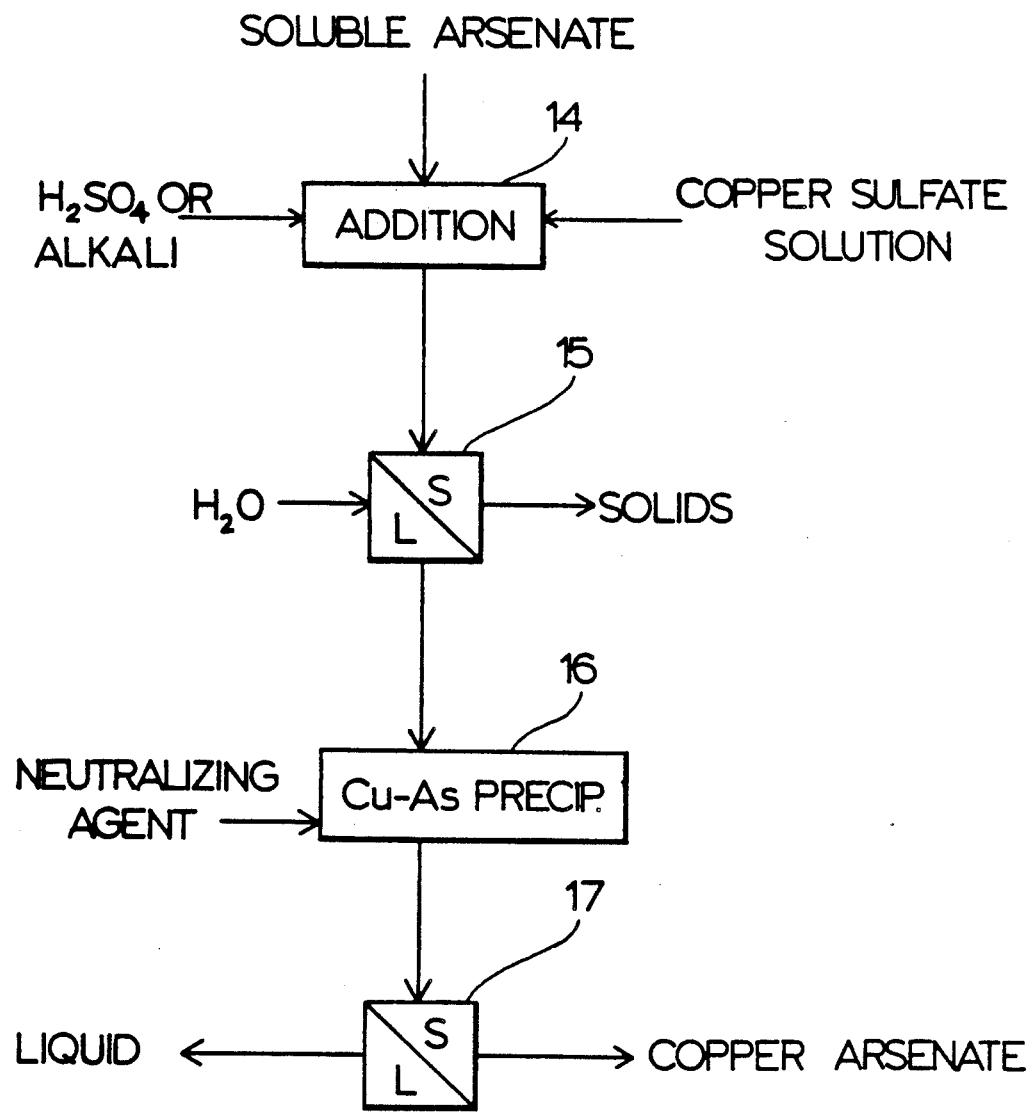
FIG. 1 is a schematic flow sheet of the preparation of copper arsenate from soluble arsenate and copper sulfate solutions.

With reference to FIG. 1, soluble arsenate and copper sulfate are fed to an addition 14. Soluble arsenate is preferably fed to addition 14 in the form of a solution. Such solution ma contain impurities such as, for example, $SiO_2$, Fe, Pb and Sb. The solution of water-soluble arsenate may be derived from at least one arsenic-containing compound capable of yielding a water-soluble arsenate. The compounds can be chosen from arsenic oxides, soluble arsenic salts and compounds, and suitable metallurgical materials that may include ores, concentrates, speisses, slags, fumes, flue dusts and the like. Alternatively, the solution of arsenate may, for example, be an arsenate solution, e.g. arsenic acid, derived from a solvent extraction process. Any arsenite is easily converted to arsenate by any one of a number of oxidation methods known in the art. It is noted that industrial and most commercial-grades of arsenic oxides and arsenic compounds and, of course, the arsenates derived from metallurgical materials contain impurities The preferred soluble arsenate solutions are aqueous solutions of sodium arsenate, ammonium arsenate and arsenic acid.

Copper sulfate is fed to addition 14 in the form of copper sulfate crystals that may contain occluded impurities such as fine lead sulfate, or as a copper sulfate solution containing dissolved impurities such as iron, silica, and lead. The copper sulfate solution may be derived from at least one copper-containing compound capable of yielding copper sulfate. The compound can be chosen from copper sulfate, copper oxides and metallurgical materials that may include ores, concentrates, speisses, slags, slimes, dusts, mattes, copper scrap and the like. It is noted that copper sulfate crystals, copper oxides, and copper sulfate derived from metallurgical materials usually contain impurities. The copper sulfate solution may also contain sulfuric acid as well as dissolved metals such as As, Sb, Zn, Cd, In, Ni and Co.

In addition 14 water soluble arsenate is mixed with copper sulfate solution. The addition 14 may be carried out by adding arsenate solution to copper sulfate solution or by adding copper sulfate solution to arsenate solution, the addition of arsenate solution to copper sulfate solution being preferred, as will be explained. Either one solution or both solutions may contain impurities. The addition 14 is preferably carried out with agitation. The conditions in addition 14 are controlled such that no copper arsenate precipitates.

The quantity of arsenate and the quantity of copper sulfate fed to addition 14 are controlled to form a copper and arsenic-containing solution which contains the amounts of arsenic and copper necessary to form copper arsenate in a subsequent step (to be described). The amount of arsenic and the amount of copper in addition 14 may vary within broad ranges. Preferably, amounts of arsenic and copper are added to yield, in a subsequent step, copper arsenate wherein the weight ratio of copper to arsenic is about unity. If desired, the arsenate and copper sulfate solutions may be diluted or concentrated prior to adding to addition 14.

The copper sulfate and arsenate solutions are combined in addition 14 for the formation of a copper and arsenic-containing solution, but without precipitating copper arsenate. The addition 14 is carried out at a temperature in the range of about 60 to 100° C. and, preferably, at a temperature of about 80° C. The pH during addition must be controlled in a range in which sludge-forming impurities precipitate, but in which copper arsenate does not commence to precipitate. Specifically to prevent copper arsenate from precipitating, pH must be controlled at values of less than about 2.2. A pH not lower than about 1.8 is necessary for the precipitation and removal of the sludge-forming impurities, especially iron, lead and antimony The pH in addition 14 is, therefore, controlled at values below about 2.2 and preferably in the range of about 1.8 to 2.2, causing the sludge-forming impurities to precipitate. Most preferably, the pH is controlled at a value of about 2.0. Depending on the pH of the arsenate solution and the copper sulfate, an amount of sulfuric acid or alkaline substance may be added in order to control the pH in addition 14 in the desired range.

When the solution of arsenate is, for example, arsenic acid, the arsenate solution (pH about 2) may be added to the copper sulfate solution or vice versa. Depending on the pH of the copper sulfate solution and its free acid content, if any, an amount of alkaline substance is added to maintain the pH during addition below 2.2. On the other hand, if the arsenate solution is, for example, a sodium arsenate solution, the arsenate solution should be added to the copper sulfate solution with addition of an amount of sulfuric acid to avoid precipitation of copper arsenate. It is noted that any copper arsenate that precipitates may in some cases dissolve but in most cases will not redissolve entirely due to the formation of certain species of copper arsenate. Generally it is, therefore, preferred to add the solution of arsenate to the copper sulfate solution.

After the addition and mixing in addition 14 has been completed, the copper and arsenic-containing solution and precipitated impurities are passed to a liquid/solids separation 15, wherein the solids are separated from the copper and arsenic-containing solution. Separation 15 may be carried out by any one of a number of known liquid-solids separation methods, filtration being preferred. Filter aid is preferably added to improve filtration and also to prevent any gelling that may occur. The solids are washed with water on the filter to reduce the amounts of dissolved arsenic and copper that may accompany the solids. The solids which mainly consist of iron arsenate, lead sulfate, antimony compounds and silica are removed from the process.

The copper and arsenic-containing solution from separation 15 is subsequently neutralized in copper arsenate precipitation 16 to precipitate copper arsenate. A suitable alkaline neutralizing agent, preferably in the form of a solution, is added to increase the value of the pH above about 2.2, above which value copper arsenate commences precipitation. Suitable alkaline neutralizing agents include sodium hydroxide, potassium hydroxide, ammonia and ammonium hydroxide. The neutralizing agents should preferably be substantially free of chloride, as chloride is quantitatively precipitated as a chloro-copper arsenate. The pH is preferably controlled in the range of about 3.5 to 5.0. Below a pH of 3.5 precipitation is only about 90% complete, and at a pH above about 5 undesirable species of copper arsenate may precipitate, and any nickel present will also precipitate. The addition of the neutralizing agent is continued until the pH reaches a value of about 5.0, preferably a value of about 4.2. Precipitation 16 is carried out at a temperature in the range of about 60 to 90° C., preferably at about 80° C.

After copper arsenate precipitation is complete, the material from precipitation 16 is subjected to liquid-solids separation 17, wherein a liquid fraction is separated from the solid copper arsenate. The liquid fraction which contains mainly sulfate as well as other dissolved materials, such as for example Ni, Co, Na and F, is removed from the process. The solids fraction is washed and copper arsenate substantially free of impurities that may form a sludge in the preparation, storage or application of wood preservatives, is recovered as product. The copper arsenate contains not more than about 0.1% total of iron and lead by weight. If desired, the copper arsenate may be mixed with arsenic acid and chromic acid in the appropriate proportions to form chromated copper arsenate.

In preferred embodiments of the method according to the invention, a solution of soluble arsenate containing impurities may be obtained from arsenic and antimony-containing flue dusts and the arsenate solution is added to copper sulfate solution, or copper sulfate solution containing impurities may be obtained from copper matte and a solution of arsenate is added to the copper sulfate solution. In the most preferred embodiment, arsenate solution is derived from flue dusts and copper sulfate solution is derived from copper matte, both solutions containing impurities. The solution of soluble arsenate is added to the copper sulfate solutions in addition 14, precipitated impurities are separated, copper arsenate is precipitated in precipitation 16 and recovered, as described with reference to FIG. 1.

It is understood, however, that, although the preferred embodiments are described with specific reference to flue dust and copper matte, the arsenate and copper sulfate solutions may be obtained from other similar materials that can be treated to yield the desired solutions for the preparation of copper arsenate substantially free of sludge-forming impurities.

Figure 2:
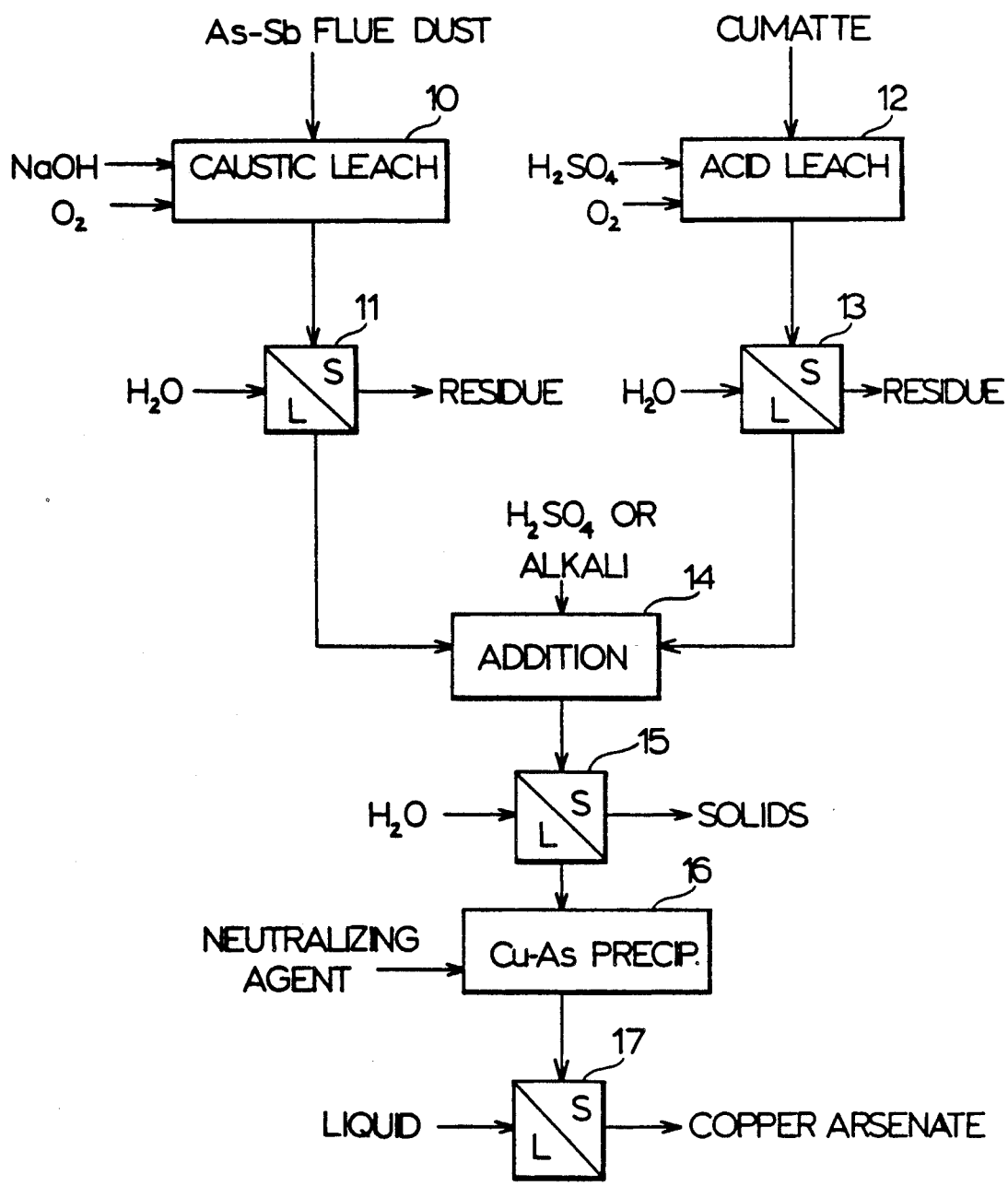
FIG. 2 is a schematic flow sheet of the preparation of copper arsenate from arsenic and antimony-containing flue dust and copper matte.

With reference to FIG. 2, arsenic and antimony-containing flue dusts of varying compositions are treated in an aqueous caustic soda oxidative pressure leach 10. The flue dusts, which are obtained from the metallurgical processing of complex concentrates, contain oxides and mixed oxides of arsenic and antimony and may also contain varying amounts of one or more of the following elements: Fe, Pb, Ag, Se, Te, Cu, Si, Cl and F. The amounts of arsenic and antimony may vary from a few percent to as high as 60%. The flue dusts are generally hydrophobic and very fine having particle sizes that are usually smaller than 150 microns and often smaller than 44 microns.

Arsenic and antimony-containing flue dust, sodium hydroxide and water are fed to leach 10. Because of toxic properties the flue dusts are preferably handled in the form of a slurry. Preferably, the flue dust is slurried with a solution of sodium hydroxide to prepare a pumpable slurry with a high solids content. The slurry of flue dust, the remaining portion of the sodium hydroxide and water are pumped to leach 10 in amounts that will yield a leach solution containing arsenic in a concentration in the range of about 50 to 110 g/L, preferably about 75 to 90 g/L. Although leach solutions containing less than 50 g/l arsenic may be produced, such leach solutions are unnecessarily dilute and bulky. Solutions containing about 110 g/l approach saturation levels. The amount of sodium hydroxide added as solid or in solution to the leach is proportionate to the amounts of arsenic and antimony in the dust and is calculated from the equation:

$$\text{weight NaOH} = 1.6 \times \text{weight of As} + 0.33 \times \text{weight of Sb}.$$

To improve the separation of arsenate from antimonate, an additional, i.e. excess, amount of sodium hydroxide in the range of about 10 to 50 g/L may be added. This amount is in excess of the stoichiometric amount of sodium hydroxide with respect to the amount of arsenic and antimony in the flue dust, i.e. the amount calculated by means of the above equation. Preferably, the sodium hydroxide is substantially free of chloride.

The leach is carried out in an autoclave to which oxygen is added to a total pressure in the range of about 0.7 to 2.0 MPa. The autoclave contents are agitated and heated to a temperature in the range of about 120 to 180° C. Heat for the pressure oxidation may be provided by preheating the feed to a temperature in the range of about 50 to 100° C., by a heating jacket or heating coils, or autogenous heating due to the exothermic reaction, or combinations of these. If necessary, indirect cooling may be used to maintain the desired temperature. The leach is usually completed in a time period of from about 15 to 120 minutes, usually within about 30 to 60 minutes. As noted, the autoclave contents are preferably agitated vigorously, which not only achieves total suspension and mixing of solids but also yields a coarse leach residue. For example, using a propellor agitator rotated at high speed provides the required vigorous agitation. The leach 10 may be carried out batchwise or continuously, the latter being preferred.

The autoclave contents are discharged and subjected to liquid-solids separation 11. Separation 11 may be carried out by conventional means such as filtration, settling or centrifuging, either alone or in combination; vacuum or pressure filtration being preferred. The solids may be washed with water, but, preferably, are washed with a dilute, hot caustic soda solution to prevent blinding of the filter. The liquid fraction from separation 11 is a sodium arsenate-containing solution which is fed to addition 14, described with reference to FIG. 1.

The residue from separation 11 may be recovered as such, or may be treated for the recovery of antimony, as metal or as antimonial lead, and of other values Typically, the residue may contain 45-48% Sb, 9% Na, 0.2% As, as well as other impurities such as Ag, Se, Te, Cu, Pb and Bi in proportion to their presence in the feed material.

For the preparation of copper sulfate solution, copper matte is treated, preferably continuously, in an aqueous oxidative acid pressure leach 12 in a reaction mixture with sulfuric acid to produce a copper sulfate-containing leach solution. Mattes that can be treated may contain Cu, Pb, S, Fe, Co, Ni, Zn, As, Sb and other elements as well as $SiO_2$ and precious metals.

Copper-containing matte is slurried with sulfuric acid and the reaction mixture is subjected to matte leach 12 in an autoclave and in the presence of an oxygen-bearing gas at elevated temperature and pressure. The matte should have small particle sizes, and may be subjected to a size reduction, preferably to particle sizes of 100 micron or less prior to being fed to the reactor. Small particle sizes are important to enable continuous operation and to effect conversion of the sulfur content to sulfate which simplifies autoclave discharge and separation of the copper sulfate solution.

Leach 12 is carried out with agitation at a temperature in the range of about 100 to 150° C. and under a partial pressure of oxygen in the range of about 0.7 to 2.0 MPa. Temperatures higher than 150° C. can be used for elemental sulfur to be fully oxidized to sulfate. Note that above 158° C., an elemental sulfur melt is highly viscous. The retention time is three hours or less, depending on temperature and pressure. The amount of sulfuric acid added to the leach is adjusted to yield a leach solution that contains about 200 g/L copper. Such amount of acid is sufficient to extract at least 98% of the copper from the matte, as well as any Fe, Co, Ni, Zn and As, and a portion of the Sb, leaving Pb, precious metals and the remaining Sb in a residue. The sulfur content of the matte is substantially oxidized to sulfate.

After the leach is completed, the reaction mixture is discharged by flashing into a suitable flash tank and the flashed reaction mixture is subjected to liquid-solids separation 13 for the separation of leach solution from leach residue.

Liquid-solids separation 13 may be carried out by anyone of a number of known methods, but is preferably carried out by pressure filtration. The leach residue is washed on the filter with water and subsequently removed from the process. The leach residue contains mainly lead as lead sulfate, some unreacted matte, any precious metals and the major portion of the antimony present in the matte.

The liquid fraction from separation 13 is a copper sulfate solution containing amounts of As, Fe, Co, Ni and Zn as well as small amounts of dissolved Pb and Sb. This copper sulfate solution may be directly fed to addition 14, as described with reference to FIG. 1, wherein the arsenate solution is added to copper sulfate solution at a pH controlled at a value of less than about 2.2. The amounts of copper sulfate and arsenate solutions added in addition 14 are controlled so that copper arsenate can be precipitated in a subsequent step. The amounts of arsenic and copper in the respective solutions may vary within broad ranges and the solutions may be diluted or concentrated, as desired. Depending on the alkalinity of the arsenate solution and the acidity of the copper sulfate solution, sulfuric acid or an alkaline substance may be added as required to maintain the value of the pH below about 2.2. pH values of less than about 2.2 cause the lead, iron and at least some of the antimony in the copper sulfate and arsenate solutions to precipitate, but does not cause precipitation of copper arsenate. After separation of precipitated material in separation 15, copper arsenate substantially free of sludge-forming impurities, especially iron and lead, is precipitated in precipitation 16 and recovered, substantially as described. The liquid fraction from the final separation 17 contains all the Ni, Co, F and Cl, as well as $Na_2SO_4$, As and Cu.

The invention will now be illustrated by means of the following non-limitative examples.

EXAMPLE 1

A caustic pressure leach was carried out to prepare an arsenate containing solution. 19.60 kg of flue dust containing 26.8% As, 50.5% Sb and 0.7% Pb was wetted with a dilute sodium hydroxide solution and then mixed into a slurry containing 310 g/l solids by adding 50% sodium hydroxide solution in an amount such that the leach solution contained 45 g/l free sodium hydroxide to ensure formation of sodium antimonate. The slurry was preheated to 80° C. and subjected to leaching in an autoclave under an oxygen pressure of 2 MPa and with agitation. The temperature increased to 150° C. and was controlled at this value by applying cooling water to the autoclave jacket. The leach was continued for one hour after which the reaction mixture was discharged to a flash tank. The slurry from the flash tank was subjected to pressure filtration the cake was washed and 63.27/1 filtrate and 20.20 kg residue were recovered. The filtrate contained 78.0 g/l As, 0.09 g/l Sb, 1.92 g/l Pb and 45.0 g/l NaOH. The residue contained 49.0% Sb, 0.40% As, 0.54% Pb and 6.1% $H_2O$. The recovery of As to solution was 98.5% and that of Sb to the sodium antimonate residue was 99.9%. Extraction of Pb into solution was 52.7%.

The results show that a pressure oxidative caustic soda leach of a flue dust is successful in extracting substantially all of the arsenic into solution leaving substantially all of the antimony in the residue as sodium antimonate, while about half of the lead in the dust is dissolved.

EXAMPLE 2

A copper matte was pressure leached to prepare a copper sulfate—containing solution. Prior to leaching, the matte was ground in a ball mill for 30 minutes at 65% solids to yield 98.5% less than 44 microns ground matte.

6.51 kg of the ground matte, containing 40.0% Cu, 40.0% Pb, 16.6% S and small amounts of As, Sb, Fe and Ni, were slurried with 1.54/l of sulfuric acid and the slurry was added to an autoclave and preheated to 90° C. The reaction mixture was agitated and kept under an oxygen pressure of 2 MPa. The temperature rose to 150° C. and was controlled at this value. The solids loading in he autoclave was 543 g/l. The retention time of the reaction mixture in the autoclave was 90 minutes. The discharging slurry was flashed and then pressure filtered 12 liters of filtrate assayed 222 g/l Cu, 0.039 g/l Pb, 0.77 g/l Fe, 0.51 g/l Sb, 4.2 g/l As and 31 g/l acid. The residue weighed 4.14 kg and contained 0.54% Cu, 66.3% Pb and 11.1% S. Copper extraction was 99.2%.

The results show that a ground copper-lead matte can be readily pressure leached under oxygen to yield a copper sulfate solution containing more than 200 g/l copper as copper sulfate.

EXAMPLE 3

This example shows that a copper and arsenate - containing solution substantially free of sludge-forming impurities can be made under controlled conditions from an arsenate solution and a copper sulfate solution that contain such impurities.

Arsenate Solution (70 g/l As, 0.10 g/l Sb and 0.82 g/l Pb; pH 10.5) was pre-neutralized with $H_2SO_4$ to pH 7 and filtered. The filtered solution contained 50 g/l As, 0.12 g/l Sb and 0.008 g/l Pb. The arsenate solution was added over a period of 60 minutes to and mixed with a matte leach liquor. The copper sulfate solution was preheated to 80° C. The final pH of the copper and arsenic-containing solution was adjusted to 2.2 by the addition of sulfuric acid. Temperature was maintained at 80° C. The volume of arsenate solution added was controlled such that the amounts of Cu and As in the copper and arsenic-containing solution had a Cu:As ratio of 1:1. The copper and arsenic-containing solution was filtered using Dicalite as filter aid and the filter cake was washed with water. The results are shown in Table I.

TABLE I

| Cu to Pb + Fe Ratio In Cu and As Solution | Solids g/l | Dicalite g/l | Filtration Rate l/m²h | kg/m²h |
|---|---|---|---|---|
| 825 | 3.6 | 6.0 | 860 | 8 |

The analysis of the final filtered copper and arsenic-containing solution and the distribution of elements between solution and solids are shown in Table II.

TABLE II

|  | As | Cu | Pb | Fe | Sb |
|---|---|---|---|---|---|
| Filtered Solution (g/l) | 20 | 21 | 0.020 | 0.007 | 0.13 |
| Distribution (%) |  |  |  |  |  |
| Solution | 98 | 99 | 5 | 2 | 80 |
| Solids | 2 | 1 | 95 | 98 | 20 |

The results in Table II show that a copper and arsenic-containing solution can be prepared from soluble arsenate solution and a copper sulfate solution such that the final combined solution is substantially free of sludge forming impurities, i.e., the combined lead plus iron content is <0.1 g/l.

EXAMPLE 4

The preparation of a copper and arsenic-containing solution as described in Example 3 was carried out with a soluble arsenate solution and a copper sulfate-containing solution of different compositions. The feed solutions, the copper and arsenic-containing solution and the filter cake were analyzed. The results are given in Table III. The filtration rate was 880 l/m².h. The Cu-As solution had a Cu to Fe+Pb ratio of 810:1.

TABLE III

|  | Weight (kg) or Volume (l) | pH | Analyses (g/l or %) | | | | |
|---|---|---|---|---|---|---|---|
|  |  |  | Cu | As | Pb | Fe | Sb |
| Cu Feed Solution | 130 | 1.0 | 68 | 5.8 | 0.02 | 0.16 | 0.24 |
| As Feed Solution | 169 | 11.0 | — | 53.0 | 0.59 | — | 0.15 |
| Cu—As Solution | 340 | 2.2 | 26 | 26 | 0.027 | 0.005 | 0.11 |
| Filter Cake | 1.5 | — | 2.3 | 10.2 | 5.6 | 3.0 | 0.93 |

EXAMPLE 5

This example illustrates the precipitation of copper arsenate from copper and arsenic-containing solution obtained from the addition of soluble arsenate solution and copper sulfate solution at pH ≦ 2.2.

Copper and arsenic-containing solution was heated to 79° C. and a 12% caustic solution was added slowly over a period of 40 minutes to raise the pH to 5.0, with vigorous agitation. Precipitation of copper arsenate began at a pH of 2.3. After completion of the caustic addition, the slurry was filtered. The filter cake was back-washed with 20 l of water at 80° C. for 3.5 minutes and then air blown for 10 minutes. The mass balance of the precipitation test is given in Table IV.

TABLE IV

|  | Weight (kg) or Volume (l) | pH | Analysis (g/l or %) | | | | | | |
|---|---|---|---|---|---|---|---|---|---|
|  |  |  | Cu | As | Pb | Fe | Sb | Na | Cl |
| Cu—As Solution | 175 | 2.16 | 30 | 28 | 0.025 | 0.008 | 0.11 | — | — |
| Cu As Product | 22.7 | — | 31.5 | 31.8 | 0.028 | 0.01 | 0.12 | 2.8 | 0.05 |
| Residual Solution | 210 | 5.01 | 0.18 | 0.58 | <0.001 | <0.001 | 0.002 | 57 | — |
| % Distribution Based on Output | | | | | | | | | |
| Cu As Product |  |  | 99.2 | 97.5 | 100 | 100 | 97.7 | 3.4 | 100 |

TABLE IV-continued

| | Weight (kg) or Volume (l) | pH | Analysis (g/l or %) | | | | | | |
|---|---|---|---|---|---|---|---|---|---|
| | | | Cu | As | Pb | Fe | Sb | Na | Cl |
| Residual Solution | | | 0.8 | 2.5 | 0 | 0 | 2.3 | 96.6 | 0 |

The recovery of Cu and As in the copper arsenate was 99.2 and 97.5% respectively, based on the copper and arsenic-containing solution.

It is understood that variations may be made in the embodiments of the present invention without departing from the scope of the appended claims. For example, although for ease of description, the disclosure generally refers to adding arsenate to copper sulfate, it is within the scope of certain embodiments of the invention to add copper sulfate solution to arsenate solution.

We claim:

1. A method for the preparation of copper arsenate comprising the steps of adding a solution of water soluble arsenate derived from at least one arsenic-containing compound selected from the group consisting of arsenic oxides, water-soluble arsenates comprising sodium arsenate and ammonium arsenate, arsenic compounds comprising arsenic acid, and metallurgical materials comprising ores, concentrates, speisses, slags, fumes and flue dusts capable of yielding water-soluble arsenate to a copper sulfate solution, at least one of the arsenate solution and said copper sulfate solution containing sludge-forming impurities comprising antimony, iron and lead, to form a copper and arsenic-containing solution without precipitating copper arsenate, the amount of copper and the amount of arsenic in said copper and arsenic-containing solution being such that copper arsenate can be formed; causing said impurities to precipitate by controlling the pH at a value in the range of about 1.8 to about 2.2 by the addition of sulfuric acid or alkaline substance in which said sludge-forming impurities precipitate and in which copper arsenate does not precipitate; separating precipitated impurities from said copper and arsenic-containing solution; neutralizing said copper and arsenic-containing solution to precipitate copper arsenate; and recovering copper arsenate containing not more than about 0.1% total of iron and lead by weight.

2. A method as claimed in claim 1, wherein said copper sulfate solution is derived from at least one copper-containing compound chosen from copper sulfate, and copper compounds comprising copper oxides and metallurgical materials comprising ores, concentrates, speisses, slags, dusts, mattes, slimes and copper scrap capable of yielding copper sulfate.

3. A method as claimed in claim 1, wherein said adding is carried out at a temperature in the range of about 60 to 100° C. and said pH is controlled at a value in the range of about 1.8 to about 2.2.

4. A method as claimed in claim 3, wherein said pH in said adding is controlled at a value of about 2.0.

5. A method as claimed in claim 1, wherein said arsenate solution is an aqueous solution of sodium arsenate.

6. A method as claimed in claim 1, wherein said copper sulfate solution is added to said solution of water-soluble arsenate.

7. A method as claimed in claim 1, wherein said neutralizing of said copper and arsenic-containing solution is carried out at a temperature in the range of about 60 to 90° C. by adding a suitable alkaline neutralizing agent to a value of the pH of said solution in the range of from about 3.5 to about 5.0.

8. A method as claimed in claim 7, wherein said neutralizing of said copper and arsenic-containing solution is carried out at a temperature of about 80° C. by adding sodium hydroxide to a value of the pH of about 4.2.

9. A method as claimed in claim 1, wherein said solution of water soluble arsenate is derived from arsenic and antimony-containing flue dust, said flue dust is subjected to an aqueous caustic soda oxidative pressure leach to selectively leach arsenic from said flue dust to form a leach residue and to form a leach solution containing sodium arsenate and said sludge-forming impurities, and separating said leach residue from said leach solution.

10. A method as claimed in claim 1, wherein said copper sulfate solution is derived from copper matte, said copper matte is subjected to an aqueous acid oxidative pressure leach to leach copper selectively from said matte to form a leach residue and to form a leach solution containing copper sulfate and said sludge-forming impurities, and separating said leach residue from said leach solution.

11. A method as claimed in claim 10, wherein said leach solution is added to said solution of water-soluble arsenate.

12. A method as claimed in claim 9, wherein said adding is carried out at a temperature in the range of about 60 to 100° C., said pH during said adding is controlled at a value in the range of about 1.8 to about 2.2, and said neutralizing is carried out at a temperature in the range of about 60 to 90° C. by the addition of a suitable alkaline neutralizing agent to a value of the said pH in the range of from about 3.5 to about 5.0.

13. A method as claimed in claim 10, wherein said adding is carried out at a temperature in the range of about 60 to 100° C., said pH during said adding is controlled at a value in the range of about 1.8 to about 2.2, and said neutralizing is carried out at a temperature in the range of about 60 to 90° C. by the addition of a suitable alkaline neutralizing agent to a value of the said pH in the range of from about 3.5 to about 5.0.

14. A method as claimed in claim 12, wherein said adding is carried out at a temperature of about 80° C., said pH during said adding is controlled at a value of about 2.0, and said neutralizing is carried out at a temperature of about 80° C. by the addition of sodium hydroxide to a value of the said pH of about 4.2.

15. A method as claimed in claim 13, wherein said adding is carried out at a temperature of about 80° C., said pH during said adding is controlled at a value of about 2.0, and said neutralizing is carried out at a temperature of about 80° C. by the addition of sodium hydroxide to a value of the said pH of about 4.2.

16. A method as claimed in claim 10, wherein said arsenate solution is derived from an arsenic compound chosen from the group consisting of arsenic oxides and water-soluble arsenic salts comprising sodium arsenate and ammonium arsenate.

17. A method as claimed in claim 10, wherein said arsenate solution is an aqueous solution of sodium arsenate.

18. A method as claim 9, wherein said aqueous caustic soda oxidative pressure leach is carried out with an amount of dust slurried in a solution of sodium hydroxide, and an amount of sodium hydroxide and with added oxygen, at a temperature in the range of about 120 to 180° C., under a pressure in the range of about 0.7 to 2.0 MPa and with agitation, the amounts of dust, sodium hydroxide and water being sufficient to yield a leach solution containing arsenic in an amount in the range of about 90 to 100 g/l as sodium arsenate.

19. A method as claimed in claim 18, wherein said amount of sodium hydroxide is calculated from the weight of arsenic and the weight of antimony in said flue dust according to:

weight NaOH = 1.6 × weight of As + 0.33 × weight of Sb.

20. A method as claimed in claim 19, wherein the sodium hydroxide is added to said aqueous caustic soda oxidative pressure leach in an amount in the range of about 10 to 50 g NaOH per liter of said slurry in addition to the calculated amount of sodium hydroxide.

21. A method as claimed in claim 10, wherein said matte is subjected to a size reduction to particle sizes of 100 micron or less, and said aqueous acid oxidative pressure leach of copper matte is carried out continuously in a reaction mixture with sulfuric acid at a temperature in the range of about 100 to 150° C. and at a partial pressure of oxygen in the range of about 0.7 to 2.0 MPa.

22. A method for the preparation of copper arsenate containing not more than about 0.1% total of iron and lead by weight as sludge-forming impurities comprising the steps of:

(a) subjecting arsenic and antimony-containing flue dust to an aqueous caustic soda oxidative pressure leach in a slurry containing sodium hydroxide in an amount in the range of about 10 to 50 g sodium hydroxide per liter of slurry in excess of the amount of sodium hydroxide calculated from the weight of arsenic and antimony in said flue dust according to:

weight NaOH = 1.6 × weight of As + 0.33 × weight of Sb, and carrying out said leach at a temperature in the range of about 120 to 180° C. under a pressure with added oxygen in the range of about 0.7 to 2.0 MPa and with agitation for the formation of a first leach solution containing arsenic in an amount in the range of about 50 to 110 g/l as sodium arsenate and sludge-forming impurities and a first leach residue containing sodium antimonate;

(b) separating said first leach solution from said first leach residue;

(c) subjecting copper matte to a size reduction to reduce particle sizes to 100 micron or less, subjecting size-reduced matte to a continuous aqueous acid oxidative pressure leach in a reaction mixture with sulfuric acid at a temperature in the range of about 100 to 150° C. under a partial pressure of oxygen in the range of about 0.7 to 2.0 MPa for the formation of a second leach solution containing copper sulfate and sludge-forming impurities and a second leach residue;

(d) separating said second leach solution from said second leach residue;

(e) adding first leach solution to second leach solution at a temperature in the range of about 60 to 100° C. to form a copper and arsenic-containing solution without precipitating copper arsenate, the amount of copper and the amount of arsenic in said copper and arsenic-containing solution being such that copper arsenate can be formed, and causing said impurities to precipitate by controlling the pH at a value in the range of about 1.8 to 2.2 by adding an amount of sulfuric acid or alkaline substance during said adding of said first leach solution to said second leach solution at a value in the range of about 1.8 to 2.2;

(f) separating precipitated impurities from said copper and arsenic-containing solution;

(g) neutralizing said copper and arsenic-containing solution after said separating of impurities to precipitate copper arsenate by the addition of sodium hydroxide to a value of the pH in said solution in the range of about 3.5 to 5.0, and maintaining a temperature during said neutralizing in the range of about 60 to 90° C.; and (h) recovering precipitated copper arsenate.

23. A method as claimed in claim 22, wherein said adding of first leach solution to second leach solution is carried out at a temperature of about 80° C., said pH during said adding is controlled at a value of about 2.0, and said neutralizing is carried out at a temperature of about 80° C. by the addition of sodium hydroxide to a value of the said pH of about 4.2.

* * * * *